United States Patent

Sunaga et al.

[11] Patent Number: 5,979,103
[45] Date of Patent: *Nov. 9, 1999

[54] FISHING ROD WITH PRE-INSERTED FISHING LINE GUIDE MEMBERS AND METHOD OF MANUFACTURING THE SAME

[75] Inventors: Shunji Sunaga, Tokyo; Hiroshi Oda; Tomoyoshi Tsurufuji, both of Saitama, all of Japan

[73] Assignee: Daiwa Seiko, Inc., Tokyo, Japan

[ * ] Notice: This patent is subject to a terminal disclaimer.

[21] Appl. No.: 08/297,542

[22] Filed: Aug. 31, 1994

[30] Foreign Application Priority Data

| Sep. 3, 1993 | [JP] | Japan | 5-243633 |
| Dec. 15, 1993 | [JP] | Japan | 5-343104 |
| Dec. 27, 1993 | [JP] | Japan | 5-073671 U |

[51] Int. Cl.$^6$ .................................................. A01K 87/04
[52] U.S. Cl. ................................................ 43/24; 43/18.1
[58] Field of Search ..................................... 43/18.1, 24

[56] References Cited

U.S. PATENT DOCUMENTS

| 2,292,519 | 8/1942 | Hiner | 43/18.1 |
| 2,306,638 | 12/1942 | Meisler | 43/18.1 |
| 2,484,727 | 10/1949 | Patterson | 43/24 |
| 2,777,239 | 1/1957 | Cushman | 43/24 |
| 3,769,736 | 11/1973 | Nydam | 43/24 |
| 4,142,317 | 3/1979 | Klein | 43/24 |
| 4,212,126 | 7/1980 | Barnett | 43/24 |
| 5,564,214 | 10/1996 | Isurufuji | 43/24 |

FOREIGN PATENT DOCUMENTS

| 0409800 | 1/1991 | European Pat. Off. . |
| 2336805 | 1/1974 | Germany . |
| 4139455 | 6/1992 | Germany . |
| 56-127032 | 10/1981 | Japan . |
| 4-341133 | 11/1992 | Japan . |

*Primary Examiner*—Kurt Rowan
*Attorney, Agent, or Firm*—Liniak, Berenato, Longacre & White

[57] ABSTRACT

The invention relates to a fishing rod with pre-inserted fishing line guide members. A prepreg formed of a high-strength fiber impregnated or mixed with resin is wound to form the rod pipe. A plurality of wide fishing line guide members each having a flat-shaped section are fixed integrally to the inner peripheral surface of the rod pipe, the inner peripheral side portions of the wide fishing line guide members are respectively projected inwardly from the rod pipe inner peripheral surface, and the outer portions of the rod pipe existing in the wide fishing line guide fixed portions are respectively bulged outwardly and widely. The fishing line guide members are strongly fixed to the inner peripheral surface of the rod pipe without lowering the strength of the rod pipe.

6 Claims, 5 Drawing Sheets

FISHING ROD WITH PRE-INSERTED FISHING LINE GUIDE MEMBERS AND METHOD OF MANUFACTURING THE SAME

BACKGROUND OF THE INVENTION

The present invention relates to a fishing rod with pre-inserted fishing line guide members and a method of manufacturing such a fishing rod.

From the viewpoint of the improvement in the sliding condition of a fishing line, prevention of the frictional damage of the inner surface of a rod pipe and the like, there is disclosed in Japanese Patent Kokai Publication No. Sho. 56-127032 a fishing rod in which a plurality of fishing line guide members are previously pressure-inserted into or bonded to the inner surface of a rod pipe before it is finally formed as a main component of the fishing rod and, after the rod pipe is formed, they are fixed to the inner surface of the rod pipe. Also, there is disclosed in Japanese Patent Kokai Publication No. Hei. 4-341133 a fishing rod in which a plurality of fishing line guide annular members each formed of a single fiber are formed integrally with the inner peripheral surface of a rod pipe.

However, in the fishing rod disclosed in the former publication in which the fishing line guide members are fixed after the rod pipe is formed, the fishing line guide members can be taken off or shifted in position when the fishing rod is bent or deformed during fishing.

Also, in the fishing rod disclosed in the latter publication, the fishing line guide annular members each has a circular section shape and thus has the height, and the inner peripheral surfaces of the fishing line guide annular members are restricted by the outer peripheral surface of a mandrel when the rod pipe is formed and, therefore, if a fiber reinforced prepreg is wound round the mandrel, then the fiber reinforced prepreg is projected outwardly in the portions where the fishing line guide annular members are provided. As a result of this, if the rod pipe is heated and baked, then the reinforcing fiber is caused to meander to thereby lower the strength of the rod pipe.

Further, in case where the rod pipe is formed by means of the combination of the prepreg and mandrel, the inner surface of the rod pipe thus formed is made flush with the inner surface of the fishing line guide annular member, which hinders the fishing line guide annular member from projecting inwardly from the rod pipe inner surface. Also, in the step in which the rod pipe is formed by heating, the resin flows out from the prepreg to the surface of the mandrel so that the fishing line guide annular member is buried under the resin. Therefore, the fishing line guide annular member is not allowed to expose itself inwardly of the rod pipe inner surface.

Also, even when the inner surface of the fishing line guide annular member is exposed in part, mostly, the resin is attached to the peripheral portions of the exposed surface in the form of burrs. Thus, in this state, if a fishing line is guided, then the fishing line may be damaged by the burr-like resin, which makes it difficult for the guide annular member to perform its fishing line guide function in a stable manner.

SUMMARY OF THE INVENTION

The present invention was made in order to eliminate the drawbacks found in the above-mentioned conventional fishing rods of a type that a fishing guide annular member is previously inserted into a rod pipe to be formed.

Accordingly, it is an object of the present invention to provide a fishing rod of the above type in which a plurality of fishing line guide members can be fixed strongly to the inner peripheral surface of a rod pipe.

Another object of the present invention is to provide a fishing rod of the above-type in which the strength of rod pipe is ensured.

Yet another object of the invention is to provide a method of manufacturing a fishing rod with a pre-inserted fishing line guide member in which the fishing line guide member is exposed stably from the surface of a rod pipe and thus is able to guide a fishing line smoothly and also to reduce the insertion resistance of the fishing line.

In order to attain the above-noted and other objects, the present invention provides a fishing rod with pre-inserted fishing line guide members, in which a plurality of wide fishing line guide members each having a flat-shaped section are fixed integrally to the inner peripheral surface of an rod pipe formed by winding a prepreg made of a high-strength fiber impregnated or mixed with resin, the inner peripheral side portions of the fishing line guide members are projected inwardly from the rod pipe inner peripheral surface, and the outer portions of the rod pipe for fixing the wide fishing guide members are respectively bulged out outwardly and widely.

Since each of the fishing line guide members is arranged such that the inner peripheral side thereof is projected inwardly and the respective fishing line guide members are fixed integrally to the inner peripheral surface of the rod pipe, the fishing line guide members can be fixed strongly and thus the resistance of the fishing line can be reduced. Also, because each of the fishing line guide members is arranged such that it is wide and has a flat-shaped section, the portions of the rod pipe where the fishing line guide members are fixed are not projected suddenly but are bulged out widely and, when baking, there is eliminated the possibility that the fiber is caused to meander, which prevents the rod pipe from being lowered in strength.

The present invention further provides a method of manufacturing a fishing rod with a pre-inserted fishing line guide member in which a fishing line can be inserted through a rod pipe formed of a reinforcing fiber with resin as a matrix. The method comprises the steps of: mounting a fishing line guide member on a mandrel; interposing a resin entrance prevent member between the front and rear portions of the fishing line guide member and the mandrel; winding a fiber reinforced prepreg round the fishing line guide member, pressurizing and heating these members to thereby form a rod pipe; removing the mandrel from the thus formed rod pipe; and further removing the resin inflow prevent member therefrom.

According to the above-noted method of the invention, since the resin entrance prevent member is interposed between the front and rear portions of the fishing line guide member and the mandrel and after then the prepreg is wound, the fishing line guide member is prevented from being buried under the resin. Also, since the resin entrance prevent member is removed after the rod pipe is baked, there are generated spaces in the front and rear portions of the fishing line guide member and thus the fishing line guide member can be exposed stably from the inner surface of the baked rod pipe. Further, the resin entrance prevent member is turned into powder or the like when baked, the powder is in part removed spontaneously when the mandrel is removed, and the remaining powder is gradually removed while the fishing rod is in use. In this case as well, such way of removal of the resin entrance prevent member falls within the scope of the patent claims.

The present invention further provides a method of manufacturing a fishing rod with a pre-inserted fishing line guide member in which a fishing line can be inserted through a rod pipe formed of a reinforcing fiber with resin as a matrix. The method comprises the steps of: mounting a fishing line guide member on a mandrel through a receive member layer formed of a soft elastic member or a clay-like member; winding a fiber reinforced prepreg round the mandrel and the like from above the fishing line guide member; and pressurizing and heating these members from above the wound prepreg layer to thereby form a rod pipe.

According to the method of the invention, the fishing line guide member is mounted not directly on the mandrel but through the receive member layer formed of a soft elastic member or a clay-like member and thus, after being mounted, the transverse section of the fishing line guide member is in part buried under the receive member layer. For this reason, even if the resin flows when the fiber reinforced prepreg is wound thereon and the whole members are heated, the other portions of the fishing line guide member than the buried portion thereof are only united with the fiber reinforced prepreg. Thus, if the mandrel and receive member layer are removed after the rod pipe is formed, then only the portions of the fishing line guide member buried under the receive member layer are projected stably inwardly of the rod pipe. Also, because the fishing line guide member is mounted through the soft receive member layer, the prepreg is difficult to project outwardly in the neighborhood of the fishing line guide member, which can prevent the fiber from meandering and thus can prevent the lowered strength of the rod pipe.

The present invention further provides a method of manufacturing a fishing rod with a pre-inserted fishing line guide member in which a fishing line can be inserted through a rod pipe formed of a reinforcing fiber with resin as a matrix. The method comprises the steps of: mounting a fishing line guide member on the outer surface of a tube formed of a soft elastic member; winding a fiber reinforced prepreg round the tube from above the fishing line guide member; and placing an outer shell on the tube from above the wound prepreg layer and applying a pressure into the tube.

According to the method of the invention, since the fishing line guide members are mounted on the outside of the tube formed of a soft elastic member and also the outside of the wound prepreg layer is covered with the outer shell, if a pressure is applied into the tube, then the fishing line guide member is heated and formed in such a manner that it is pressed against the inner peripheral surface of the wound prepreg layer. However, because the outer peripheral surface of the wound prepreg layer extends along the inner surface of the outer shell and thus the diameter thereof cannot be extended outwardly, and also because the pressure is applied uniformly not only to the fishing line guide member but also to the whole tube, the fishing line guide member pressed against the prepreg layer inner peripheral surface is not wholly but only in part buried under the wound prepreg layer. For this reason, after they are formed integrally, if the tube is removed therefrom, then the fishing line guide member is stably projected inwardly of the rod pipe. Also, due to the fact that the outer shell is applied and the soft tube is inserted, the prepreg is difficult to be projected outwardly in the neighborhood of the fishing line guide member, which eliminates the possibility that the fiber can meander to thereby lower the strength of the rod pipe.

DETAILED DESCRIPTION OF THE PREFERRED EMBODIMENTS

Now, description will be given below in more detail of the invention by way of the embodiments thereof with reference to the accompanying drawings.

Figure 1:
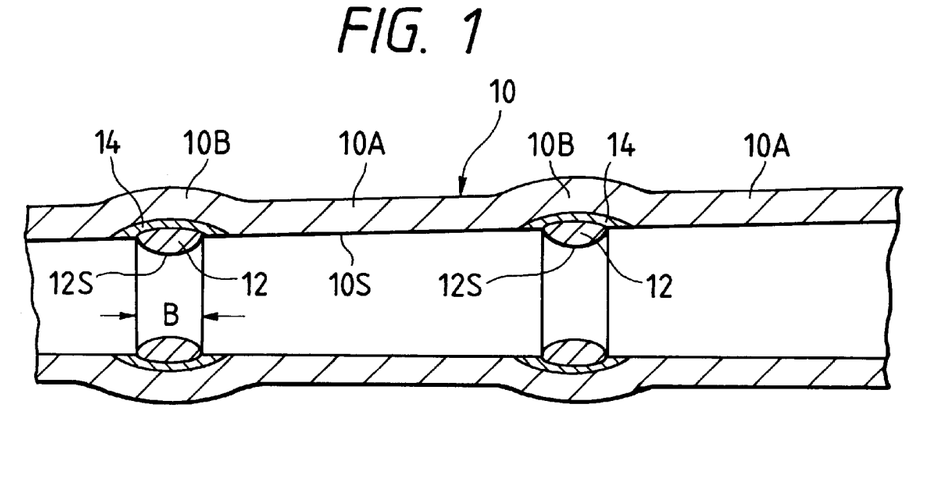
FIG. 1 is a longitudinal section view of the main portions of a fishing rod with pre-inserted fishing line guide members according to a first embodiment of the present invention.

In FIG. 1, there is shown a fishing rod with pre-inserted fishing line guide members according to a first embodiment of the invention. A rod pipe 10 is formed by winding a fiber reinforced prepreg and thereafter baking the thus wound fiber reinforced prepreg. The term "prepreg" is used in a wide sense and thus includes thermoplastic resin. The prepreg is formed, for instance, by impregnating a highly strong fiber such as carbon and the like with epoxy resin and the like or by mixing the high-strength fiber with thermoplastic resin such as polyamide and the like. A plurality of annular fishing line guide members respectively formed of ceramics or the like are fixed integrally to the inner peripheral surface of the rod pipe 10.

Each of the fishing line guide members 12 is designed such that the width dimension B thereof is greater than the thickness dimension thereof and also it has a wide and relatively flattened section. The width dimension B may be of several mm or greater. The outer peripheral portion of the fishing line guide member 12 is embedded integrally into the inner peripheral surface 10S of the rod pipe 10. However, in the present embodiment, a buffer layer 14 is interposed between the inner peripheral surface 10S of the rod pipe 10 and each of the fishing line guide members 12. That is, the outer peripheral side of the fishing line guide member 12 is embedded into the rod pipe inner peripheral surface 10S with the buffer layer 14 interposed between them, while the side of the inner peripheral surface 12S of the fishing line guide member 12 is projected inwardly from the inner peripheral surface 10S of the rod pipe 10.

Since the fishing line guide 12 is fixed embeddedly and integrally to the inner peripheral surface 10S of the rod pipe 10 when heated and baked in the above-mentioned manner, the fixing portion 10B of the rod pipe 10 where the fishing line guide member 12 is fixed is bulged or expanded outwardly. However, because the fishing line guide member 12 has a wide and relatively flattened section, the fixing or bulged portion 10B of the rod pipe 10 is bulged out widely and smoothly with respect to the remaining flat portion of the rod pipe 10, that is, the main body portion 10A of the rod pipe 10.

As a result of this, the fiber of the bulged portion 10B is not caused to meander so much to thereby be able to maintain the strength of the rod pipe 10 and also the inner peripheral surface 12S of the fishing line guide member 12 having a wide and flat-shaped section is projected inwardly, so that there can be supplied a fishing rod with pre-inserted fishing line guide members, which has a high strength and allows the fishing line to be guided smoothly. Preferably, the radial thickness of the bulged portion 10B may be slightly greater than that of the main body portion 10A in order to completely prevent the lowered strength of the fishing rod. Also, since the inner peripheral surface 12S of the fishing line guide member 12 is wide and flat-shaped, the fishing line can be guided smoothly without being damaged when compared with a fishing line guide member which is arranged such that the inner peripheral surface thereof has a small circular section.

The fishing line guide member 12 may be formed of, besides the above-mentioned ceramics, metal, a fiber reinforced material consisting mainly of resin, a fiber reinforced material consisting mainly of metal, and the like. Also, the buffer layer 14 can be formed of (soft) rubber, a fiber reinforced prepreg, a synthetic resin, a resin tape (a resin sheet will be all right as well), and the like, provided that the elastic constant thereof is lower than that of the rod pipe 10. The existence of the buffer layer 14 allows the bulged portion 10B to be bulged out further smoothly as well as lightens the influence of the bent or deformed fishing rod on the fishing line guide member 12.

Figure 3:
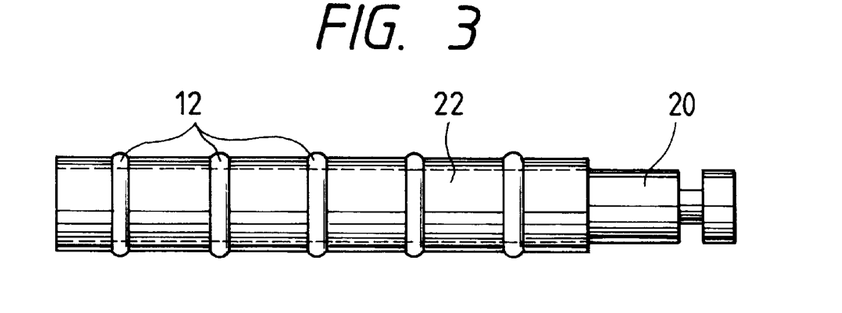
FIG. 3 is an explanatory view of a first method of manufacturing a fishing rod according to the present invention.

Next, description will be given below of a method of manufacturing a fishing rod with pre-inserted fishing line guide members shown in FIG. 1. As shown in FIG. 3, there is disposed on a mandrel 20 a receive member layer 22 which is formed of an elastic member such as a silicone tube or the like or a clay-like member, and then there are inserted on the outside of the receive member layer 22 a plurality of annular fishing line guide members 12 each having such an inside diameter as can tighten the receive member layer 22 to a certain degree.

After then, a resin tape for the buffer layer 14 or the like is wound round in a manner to cover each of the fishing line guide members 12, a fiber reinforced prepreg is wound round these members, and then the outer peripheral portion of the assembly is fastened by a fastening tape or the like. Next, the assembly with fastening tape is heated and baked to thereby form the respective annular fishing line guide members 12 and the rod pipe 10 into one united body.

After the united body is cooled, the fastening tape and mandrel 20 are removed from the united body and finally the receive member layer 22 is removed therefrom.

As described above, since the receive member layer 22 exists when the united body is formed, the portions of the annular fishing line guide members 12 which have been embedded in the receive member layer 22, that is, the inner peripheral portions of the annular fishing line guide members 12 are respectively projected with respect to the rod pipe inner peripheral surface 10S. Also, because the fixed portions of the respective fishing line guide members 12 are not pressed from outside with an unreasonable force, the portions of the rod pipe corresponding to them are smoothly bulged outwardly, with the result the reinforcing fiber does not meander so much and thus the strength of the rod pipe can be maintained.

Figure 2:
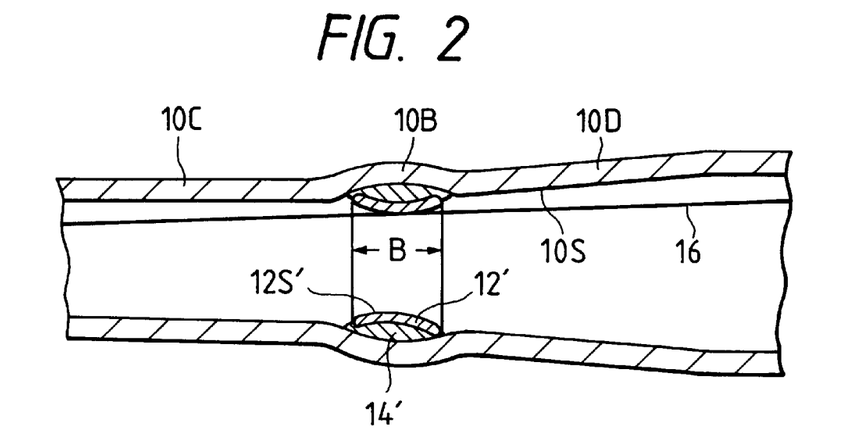
FIG. 2 is a longitudinal section view of the main portions of a fishing rod with pre-inserted fishing line guide members according to a second embodiment of the present invention.

In FIG. 2, there is shown a second embodiment of a fishing rod with pre-inserted fishing line guide members according to the invention. In FIG. 2, there is shown a rod pipe including a gently tapered rod pipe 10C and a more steeply tapered rod pipe 10D which are connected to each other. In the connecting portion of the two rod pipes 10C and 10D, a wide and flat-shaped fishing line guide member 12' having a dimension B is fixed to the rod pipe inner peripheral surface 10S through a buffer layer 14'. The inner peripheral surface 12S' of the fishing line guide member 12' is projected further than the extended surfaces of the inner peripheral surfaces of both rod pipes 11C and 10D, which prevents a fishing line 16 in a tightly stretched condition from contacting the rod pipe inner peripheral surface 10S including the connected portions thereof, thereby being able to reduce the possibility that the rod inner surface can be damaged and worn. Also, the materials of the fishing line guide members 12' and buffer layer 14' as well as the method of manufacturing the present fishing rod are similar to the first embodiment shown in FIG. 1.

As can be clearly understood from the foregoing description, according to the invention, since the fishing line guide members are fixed integrally to the rod pipe when the rod pipe is baked, the fixing force between them is strong, because the respective inner peripheral portions of the fishing line guide members are projected from the rod pipe inner peripheral surface, the fishing line can be guided accurately, and since each of the fishing line guide members is arranged so as to have a wide and flat-shaped section, the rod pipe outer side portions respectively existing in the fixed portions between the rod pipe and guide members are bulged out smoothly and widely and thus are not projected suddenly or steeply, thereby being able to prevent the rod pipe from being lowered in strength.

Now, description will be given below in more detail of another method of manufacturing a fishing rod with a pre-inserted fishing line guide member according to the invention.

Figure 4A:
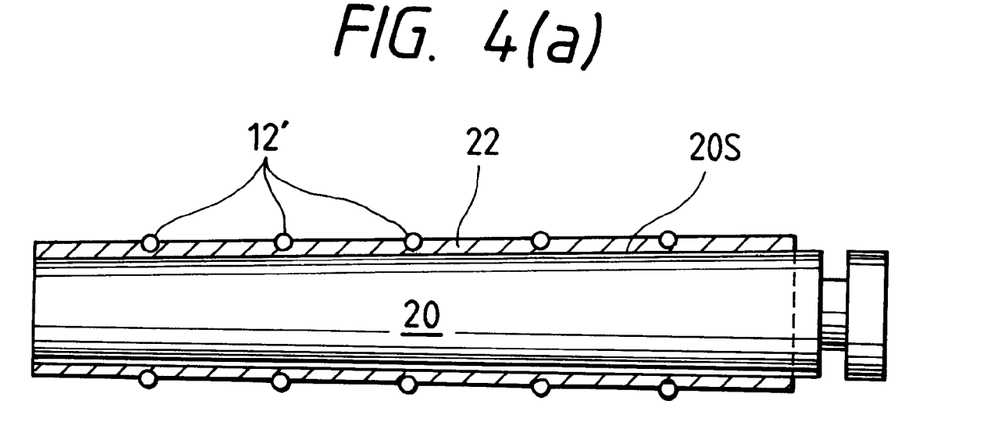
FIGS. 4(a) and 4(b) are explanatory views of a second method of manufacturing a fishing rod according to the invention.
Figure 4B:
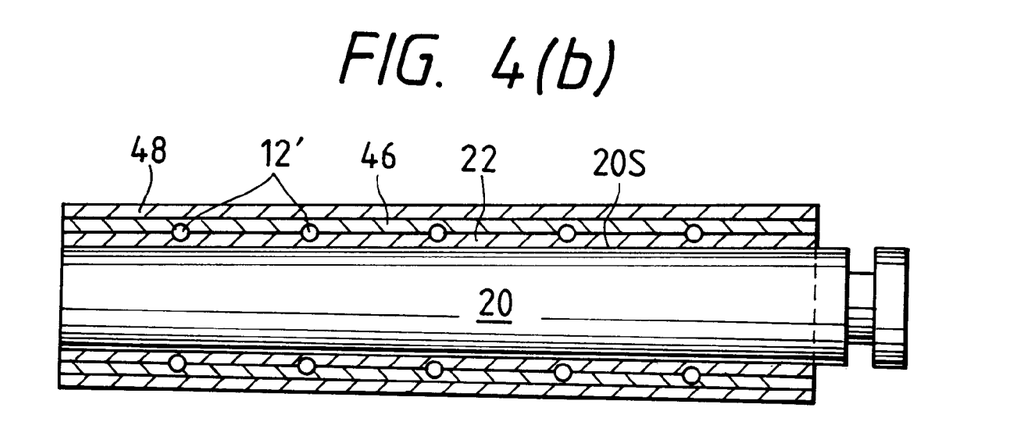

FIGS. 4(a) and 4(b) show a second method of manufacturing a fishing rod with a pre-inserted fishing line guide member according to the invention. In FIG. 4(a), there is shown a mandrel 20 which includes an outer surface 20S covered with a soft rubber tube 22. Also, a plurality of ring-shaped fishing line guide members 12' are mounted at suitable intervals in the longitudinal direction on the outer surface of the rubber tube 22. The fishing line guide members 12' may be mounted after the rubber tube 22 is mounted on the mandrel 20, or, alternatively, the fishing line guide members 12' may be previously mounted on the rubber tube 22 and, after then, the rubber tube 22 with the guide members mounted thereon may be put on the mandrel 20.

The fishing line guide member 12' may be formed of a single fiber such as boron or ceramics, or may be formed of a ring member made of any of other materials having a good sliding property, such as a ceramics ring and the like. Also, the fishing line guide members 12' may not be discrete ring members but may be one or two or more spirally-shaped guide member(s). Further, a net having wide mesh of the order of several mm may be wound round the rubber tube 22 so that a plurality of fishing line guide members 12' are formed by the net. In this case, the net may be formed of any of ceramics, metal, water repellent resin material and the like.

Instead of the rubber tube 22, a rubber tape may be wound round the mandrel 20 to cover the outer surface 20S thereof. Also, in place of the soft elastic material such as soft rubber, a clay-like material may be used to cover the outer surface 20S of the mandrel 20 and after then the fishing line guide member 12' may be mounted on the clay-like material. In any case, it is necessary that part (preferably, a half or so) of the transverse section of the fishing line guide member 12' is buried under the rubber tube 22 or the like. As the soft elastic material, silicone and the like can be used.

After the transverse section of the fishing line guide member 12' is in part buried under the tube 22 in this manner, a sheet, which is preferably formed of the same resin material as the material of the following prepreg, is wound round them to thereby form a resin material sheet layer 46 as shown in FIG. 4(b). After then, a prepreg formed of a reinforcing fiber impregnated or mixed with thermosetting resin or thermoplastic resin is wound round the resin material sheet layer 46 a required number of times to thereby form a wound prepreg layer 48 (FIG. 4(b)).

The layer 48 is not always formed of one kind of prepreg but, for example, it may be formed in a three-layer structure in which inner and outer layers are respectively formed of a prepreg with fibers arranged together mainly in the circumferential direction thereof and a middle layer is formed of a prepreg with fibers arranged together mainly in the longitudinal direction thereof. Also, in FIG. 4(b), for the purpose of easy understanding, the resin material sheet layer 46 and wound prepreg layer 48 are drawn as if they were similar in thickness to each other. However, in fact, the resin material sheet layer 46 is considerably thinner than the wound prepreg layer 48.

When the resin material sheet layer 46 is present, then the fishing line guide member 12' and wound prepreg layer 48 can be integrally formed with ease. However, according to the invention, provision of the layer 46 is not essential.

After the wound prepreg layer 48 is formed in this manner, the wound prepreg layer 18 is heated, while it is pressurized by a fastening tape or an outer shell such as a metal mold or the like, to thereby unite the fishing line guide member 12' with the wound prepreg layer 48, the united body is cooled, the mandrel 20 is removed from the united body, and the rubber tube 22 is also removed therefrom, thereby forming a rod pipe. In the thus formed rod pipe, the fishing line guide member 12' is fixed to the inner surface of the rod pipe in such a manner that it is projected inwardly by an amount corresponding to the portion thereof buried under the rubber tube 22 as shown in FIGS. 4(a) and 4(b). Also, because the soft rubber tube 22 or the like is interposed between the mandrel 20 and fishing line guide member 12', it is possible to prevent the prepreg layer 48 from being bulged outwardly if required.

According to the kind of the material of the receive material layer 22, after the rod pipe is formed by heating, the quality of the receive material layer 22 can vary so that the receive material layer 22 cannot be used any longer. However, this has no effect on the structure of the invention.

Figure 5A:
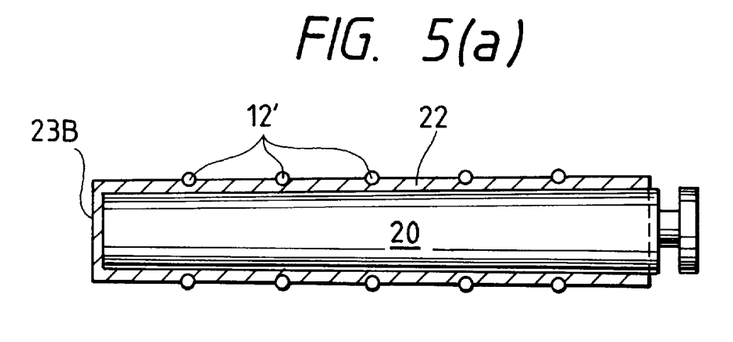
FIGS. 5(a), 5(b) and 5(c) are explanatory views of a third method of manufacturing a fishing rod according to the invention.
Figure 5B:
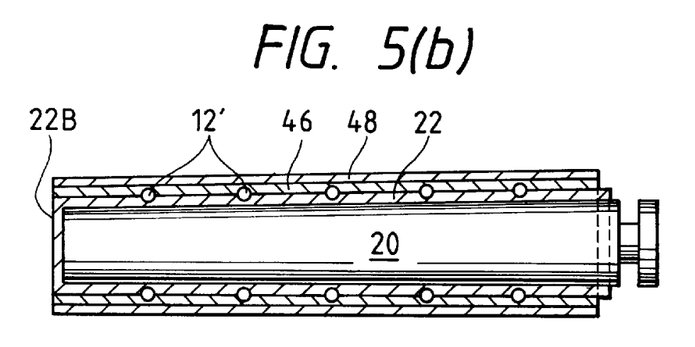

Next, description will be given below of yet another method of manufacturing a fishing rod with a pre-inserted fishing line guide member according to the invention with reference to FIGS. 5(a), 5(b) and 5(c). In the method shown in these drawings, a mandrel 20 is used but, however, the mandrel 20 is not essential. A plurality of fishing line guide members 12' are mounted at desired intervals on the outer surface of a rubber tube 22 formed of rubber or soft elastic material and including a bottom portion 22B, the rubber tube 22 with the fishing line guide members 12' mounted thereon is put on the mandrel 20, part (preferably, a half or so) of the transverse section of each of the fishing line guide members 12' is buried under the rubber tube 22 (FIG. 5(a)).

Similarly to the method described with reference to FIGS. 4(a) and 4(b), a resin material sheet is wound round the rubber tube 22 and the guide members 12' to thereby form a resin material sheet layer 46. And a prepreg is further wound round the resin material sheet layer 46 to thereby form a wound prepreg layer 48 (FIG. 5(b)). The resin material sheet layer 46 is not essential but it is preferable to insert the resin material sheet layer 46 because the existence of the layer 46 facilitates the unification of the fishing line guide members 12' and wound prepreg layer 48.

Figure 5C:
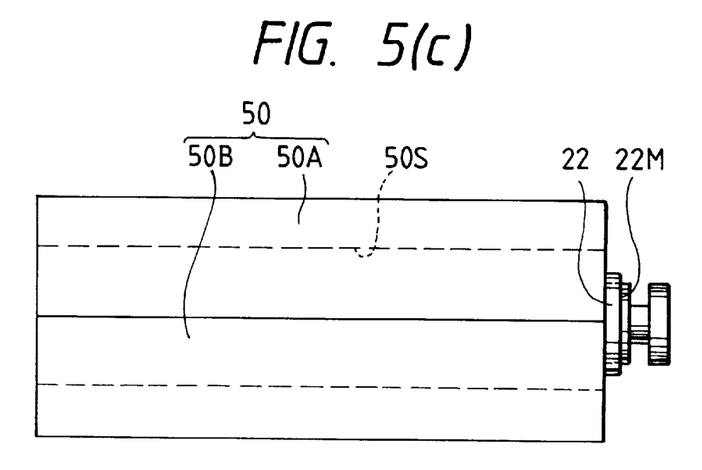

An outer shell 50 consisting of an upper mold 50A and a lower mold 50B is set over the wound prepreg layer 48, and an internal pressure (an oil pressure, water pressure, air pressure or the like) is applied into the rubber tube 22 from the end portion 22M of the rubber tube 22 (FIG. 5(c)). In this manner, the outer peripheral surface of the wound prepreg layer 48 is pressed against the inner surface 50S of the outer shell 50. Therefore, the outside shape of the wound prepreg layer 48 is restricted regardless of the internal pressure and is thus prevented from projecting outwardly.

Also, because the internal pressure is a hydraulic pressure, it applies a uniform pressure onto the inner surface of the rubber tube 22 so that the fishing line guide members 12' can be pressed against the inner surface of the wound prepreg layer 48 through the resin material sheet layer 46 with a suitable pressure. This prevents the inner surface portion of the prepreg layer 48 from being curved greatly in an outwardly projecting manner.

In this state, these components are heated to thereby unite the fishing line guide members 12' with the inner surface of the wound prepreg layer 48. After then, they are cooled and the pressure thereof is lowered, and the mandrel 20 and rubber tube 22 are taken off therefrom. If a silicone tube is used instead of a rubber tube as the soft elastic member 22, then the durability thereof can be enhanced. Also, as the fishing line guide members 12', similar members as in the first and second manufacturing methods can be used.

In the above-mentioned method, the existence of the soft receive member layer 22 or soft elastic member tube 22 acts also as a member which prevents the resin from flowing into the fishing line guide members and mandrel 20. Next, description will be given below of a fourth method of manufacturing a fishing rod with pre-inserted fishing line guide members in which no soft member is interposed between the mandrel and fishing line guide members but simply resin inflow prevent members are interposed between the mandrel and each of the front and rear portions of the fishing line guide members.

Figure 6:
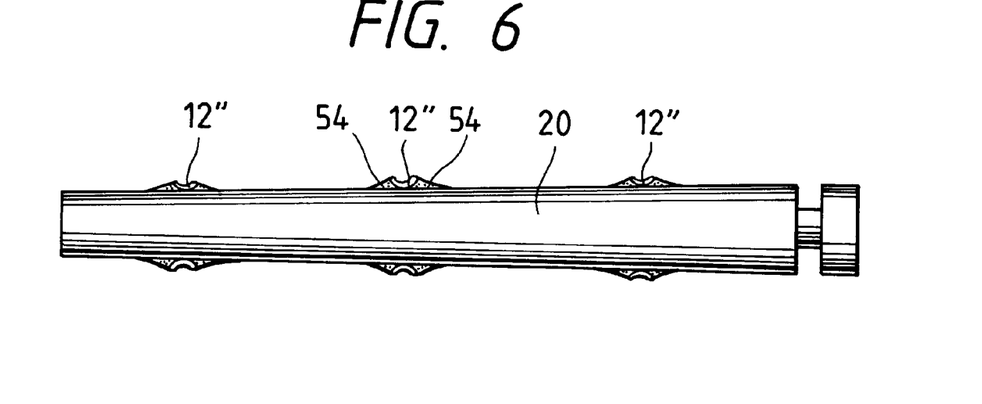
FIG. 6 is an explanatory view of a fourth method of manufacturing a fishing rod according to the invention.
Figure 7:
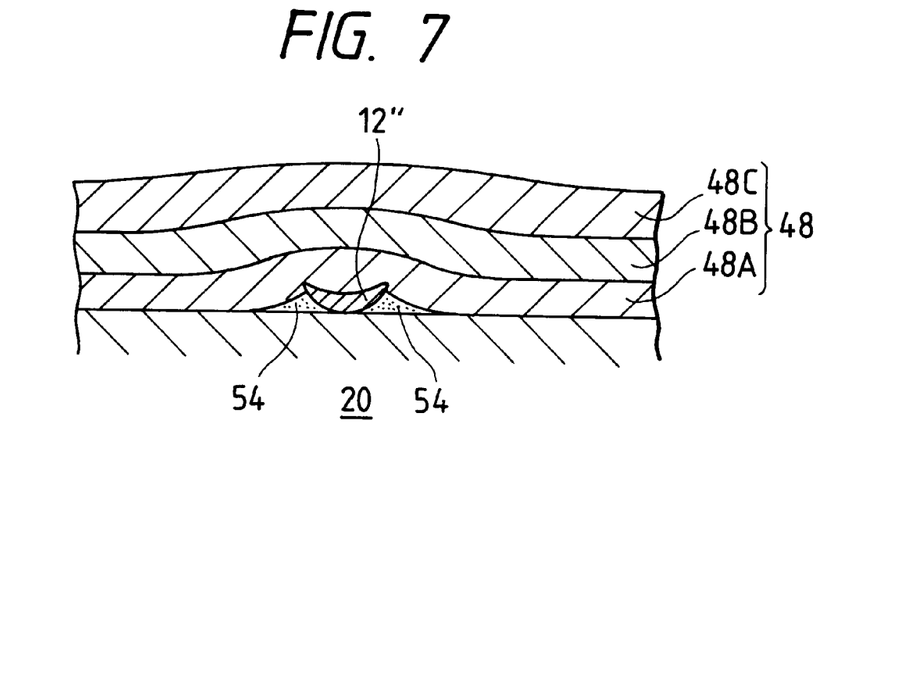
FIG. 7 is a partially enlarged view for the fourth method described with reference to FIG. 6.

FIG. 6 shows a midway step in the fourth method. At first, there is coated on the surface of a mandrel 20 a surface lubricant which can enhance the separation of the mandrel 20 from a baked rod pipe. After then, a plurality of fishing line guide members 12" are inserted from the leading end portion of the mandrel 20 into the respective stop positions thereof according to their respective inside diameters. As shown in FIG. 7 which is an enlarged section view of one of the fishing line guide members 12", the guide member 12" has a circular inner peripheral shape and a flat outer peripheral shape. In FIG. 6, after three fishing line guide members 12" differing slightly in the inside diameters thereof are inserted to their respective stop positions, the above-mentioned surface lubricant or the like is loaded into clearances respectively formed between the mandrel 20 and the front and rear portions of the fishing line guide members 12". The loaded surface lubricant is designated by 54. As the resin entrance prevent material, besides the surface lubricant, there can be used a wax material, a sealing agent such as silicone and the like.

After then, a wound prepreg layer 48 is formed on the above members. As described before, the wound prepreg layer 48 may be composed of an inner layer 48A, a middle layer 48B and an outer layer 48C. The inner and outer layers 48A and 48C are respectively formed mainly of reinforcing fibers arranged together in the circumferential direction, while the middle layer 48B is formed mainly of reinforcing fibers arranged together in the longitudinal direction. The thus wound prepreg layer 48, as shown in FIG. 7, is bulged out outwardly to some extent at the positions thereof where the fishing line guide members 12" are present. However, if such an outer shell as shown in FIG. 5(c) is used when pressurized, then such bulge can be prevented.

When the pressure is given by use of the fastening tape, such bulge is left. However, the reason why the section shape of the fishing line guide member 12" is set not circular but the outer peripheral side shape is set flat is to minimize the bulge. That is, the degree of the bulge is smaller when compared with a fishing line guide member which has such a circular section as shown in FIGS. 4(a) and 4(b). For this reason, in the second method described by use of FIGS. 4(a) and 4(b) as well, if the fishing line guide member 12' having such flat shape, then the quantity of the bulge can be further reduced.

Also, if the fishing line guide member 12" has such a crescent-shaped section as shown in FIG. 7, then the existence of the front and rear end portions in the section thereof enables the fishing line guide member 12" to bite the inner surface of the baked rod pipe integrally, thereby being able to increase the connection strength of the fishing line guide member 12" with the rod pipe.

After the rod pipe is formed in this manner, the mandrel 20 is removed therefrom and, after then, the surface lubricant 54 is dissolved by a solvent and is thus removed, with the result that, between the front and rear portions of the fishing line guide members 12" and the inner surface of the rod pipe, there are produced spaces to thereby allow the guide members 12" to be stably exposed in their respective front and rear portions. Also, since the fishing line guide members 12" extended along the outer surface of the mandrel 20, the innermost peripheral portions of the fishing line guide members 12" are present in the extension of the rod piper inner surface except for the neighborhood of the fishing line guide members 12"; that is, the innermost peripheral portions of the guide members 12" are almost flush with the extension of the rod pipe inner surface. In this case as well, since the front and rear portions of the fishing line guide members 12" are stably exposed, the fishing line can be guided smoothly without being damaged.

Also, even when the surface lubricant is dissolved by the solvent, it is turned into powder when the rod pipe is baked and, therefore, the surface lubricant is caused to drop in part when the mandrel 20 is removed and the remaining portions thereof drop gradually as the fishing rod is used, that is, they are removed naturally. Such removal falls within the scope of removal of the resin entrance prevent material according to the invention. In other words, the resin entrance prevent material can be turned into powder by heating, can be dissolved by the solvent, or can be removed by rubbing it mechanically.

Figure 8:
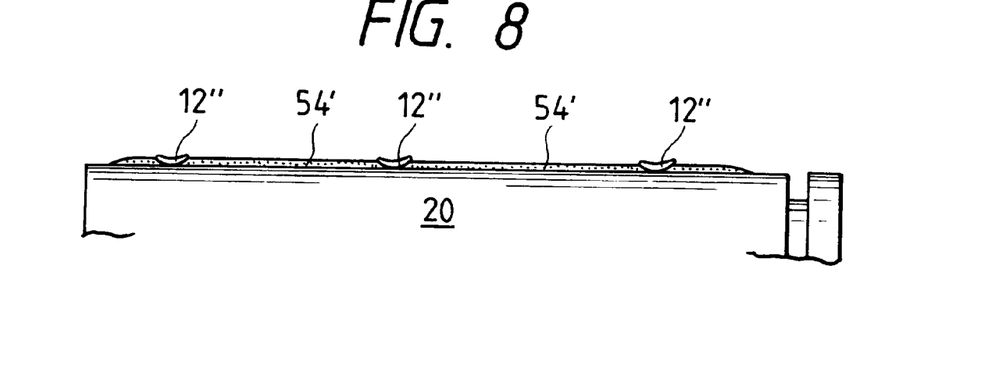
FIG. 8 is a partially longitudinal section view of a fifth method of manufacturing a fishing rod according to the invention.

Next, in FIG. 8, there is shown still another embodiment in which the innermost peripheral portion of the fishing line guide member 12", unlike the embodiment shown in FIG. 6, is projected with respect to the inner surface of the rod pipe and also, in the front and rear portions of the fishing line guide member, the inner surface of the rod pipe shows reduced unevenness. And, in order to prevent the fishing line guide members 12" from being bulged outwardly, a surface lubricant is thickly coated in a layer not only onto the front and rear portions of the respective fishing line guide members 12" but also on the surface of the mandrel between the respective fishing line guide members.

A prepreg is then wound round the thus prepared rod pipe and the rod pipe with the prepreg wound thereround is pressurized and baked. After then, if the mandrel 20 is removed and the surface lubricant in the rod pipe inner surface is cleaned out, then there can be supplied a fishing rod which includes the fishing line guide members 12" projected inwardly from the inner surface of the rod pipe.

Figure 9:
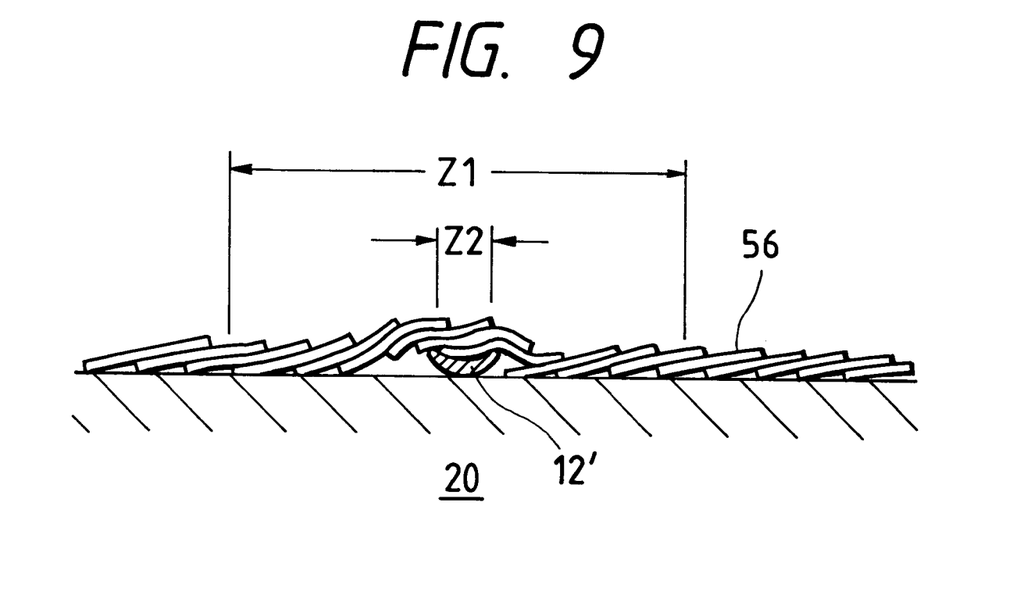
FIG. 9 is a partially longitudinal section view of a sixth method of manufacturing a fishing rod according to the invention.

Now, in FIG. 9, there is shown a further embodiment in which a fastening tape (a polypropylene tape) is used in place of the surface lubricant discussed with reference to FIG. 8. At first, a surface lubricant is coated on the mandrel 20 similarly to a normal case. Next, a given fishing line guide member 12" is put on the mandrel 20 and, in this state, a fastening tape 56 is wound round the mandrel 20. After then, the area Z1 of the fastening tape 56 in the neighborhood of the front and rear portions of the fishing line guide member 12" is provisionally fixed by an adhesive member such as a cellophane tape or the like and, next, the fastening tape 56 and the like on the upper portion Z2 of the fishing line guide member 12" are cut and removed by a knife or the like. Due to this, the areas between the front and rear portions of the fishing line guide member 12" and the mandrel 20 are covered with the remaining portions of the fastening tape, which makes it possible to prevent the resin from flowing into such areas when the rod pipe is pressurized and baked.

In this manner, the outer peripheral surface of the fishing line guide member 12" is exposed, the exposed surface of the guide member 12" is masked, and a surface lubricant is coated on the fastening tape 56. Then, the masking member is removed and a prepreg is wound. The resultant assembly is baked while it is pressurized by the fastening tape or the outer shell. After then, the mandrel 10 is removed and further the fastening tape 56 is removed from the inner periphery of the rod pipe. Thanks to this, the fishing line guide member 12" is allowed to project inwardly from the rod pipe inner surface and thus to guide the fishing line smoothly.

In this case, if only the portion of the fastening tape 56 corresponding to the area Z1 is left and the remaining portions thereof are removed, then similarly to the previous embodiment shown in FIGS. 6 and 7, the innermost peripheral portion of the fishing line guide member 12" is flush with the inner surface of the rod pipe except for the neighborhood of the fishing line guide member 12", whereas only the front and rear portions of the fishing line guide member are exposed from the inner surface of the rod pipe. In this case as well, similarly to the above-mentioned embodiments, the fishing line can be guided smoothly. Alternatively, instead of the fastening tape 56, tubes each formed by a mold having a shape corresponding to a clearance between the front and rear portions of the fishing line guide member 12" and the mandrel 20 may be disposed in the front and rear portions of the fishing line guide member to thereby prevent the resin from flowing thereinto.

In the above embodiment, the fishing line guide member 12" is described as a separate ring member. However, alternatively, a long wire-shaped member may be wound spirally round the mandrel 20 and a surface lubricant, wax or the like may be loaded between the mandrel 20 and each of the front and rear portions of the spirally wound member. Also, similarly to the second method, if a resin material sheet is used, then the fishing line guide member can be united with the wound prepreg 48 easily.

Figure 10:
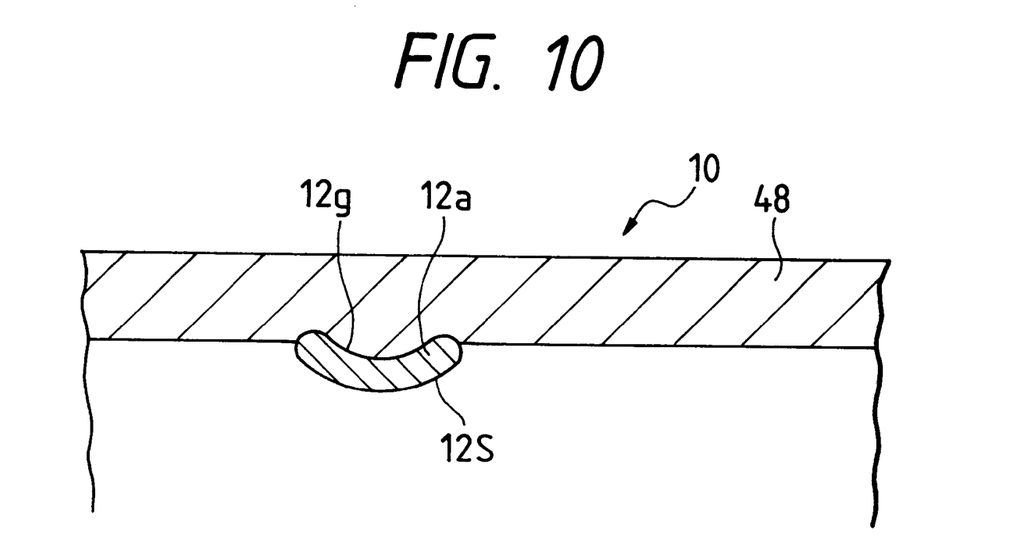
FIG. 10 is a longitudinal section view of the main portions of a fishing rod with pre-inserted fishing line guide members according to the present invention.

FIG. 10 shows a rod pipe 10 according to a still further embodiment of the present invention. The rod pipe 10 is manufactured with the method described with reference to FIG. 8. The fishing line guide member 12a used in this embodiment has a concave groove 12g formed in a outer periphery thereof to present a substantially crescent section. The concave groove 12g may be in the form of annulus circumscribing the entire outer periphery of the fishing line guide member 12a so that the fishing line guide member 12a has the substantially crescent shape at any section or alternatively, be partially formed in the outer periphery of the fishing line guide member 12a. The surface of the concave groove 12g may be processed to have a certain roughness so as to improve adhesion to the resin of the prepreg layer 48, but this is not essential. In this embodiment, the prepreg layer 48, under pressure during the manufacturing process, is projected radially inwardly and filled into a recess of the concave groove 12g, whereby after the prepreg layer 48 is hardened in this state the fishing line guide member 12a can be surely fixed to the prepreg layer 48.

As can be understood clearly from the foregoing description, according to the invention, due to the fact that a resin entrance prevent member is interposed between the front and rear portions of a fishing line guide member and a mandrel and after then a prepreg is wound round the above members before they are baked, the fishing line guide member can be formed integrally with the prepreg but is not buried under the resin of the prepreg. And, since the resin entrance prevent member is removed from the rod pipe after the rod pipe is baked, there are produced spaces in the front and rear portions of the fishing line guide member so that the fishing line guide member can be stably exposed from the inner surface of the baked rod pipe without being surrounded by burrs or the like. Therefore, the fishing line can be guided smoothly without being damaged and thus the insertion resistance of a fishing line can be decreased.

Further, according to the invention, since a fishing line guide member is mounted on a mandrel through a receive material layer formed of either a soft elastic material or a clay-like material, part of the transverse section of the fishing line guide member is buried under the receive material layer and, if a prepreg is wound round the above members to form a wound prepreg layer and the above members are baked integrally, then the integration thereof can be assured. At the same time, the buried portion of the fishing line guide member is left and is projected inwardly from the inner surface of the rod pipe and the existence of the soft receive material layer prevents the fishing line guide member from applying an unreasonable pressure to the wound prepreg layer, which prevents the rod pipe from being projected outwardly. That is, the reinforcing fiber of the prepreg is hardly caused to meander. Therefore, there can be formed a fishing rod of high strength and high quality. In more particular, the invention is able to supply a fishing rod with a pre-inserted fishing line guide member which can guide the fishing line smoothly without damaging it and can reduce the insertion resistance of the fishing line and also which is of high strength and high quality.

Furthermore, according to the invention, a fishing line guide member is mounted on the outside of a soft elastic material tube while part of the transverse section of the guide member is buried under the tube outside portion and a suitable pressure is applied to the fishing line guide member by means of a uniform pressure acting on the inner surface of the soft elastic material tube. Due to this, if the above members are baked integrally, the integration of these members can be assured and, at the same time, the buried portion of the fishing line guide member is left and projected inwardly from the inner surface of the thus formed rod pipe. Also, the existence of an outer shell prevents a wound prepreg layer from projecting outwardly. Thanks to this, the reinforcing fiber of the prepreg is prevented from meandering and thus the formed rod pipe has a high strength and is also improved in quality. Therefore, the third invention is able to supply a fishing rod with a pre-inserted fishing line guide member which can guide a fishing line smoothly without damaging it and also can reduce the insertion resistance of the fishing line and also which has a high strength and a high quality.

What is claimed is:

1. A fishing rod with at least one pre-inserted fishing line guide member, comprising:

a rod pipe formed by winding a prepreg, said rod pipe extending in a longitudinal direction and defining an inner peripheral surface and an outer peripheral surface, and at least one fishing line guide member fixed integrally to the inner peripheral surface of said rod pipe, and wherein:

said at least one fishing line guide member has a relatively flattened section and defines an inner peripheral side and an outer peripheral side;

the inner peripheral side of said fishing line guide member projects radially inwardly from the inner peripheral surface of the rod pipe; and the outer peripheral side of said fishing line guide member is received by a bulged portion integrally molded as part of said rod pipe, said bulled portion being bulged radially outwardly in a relatively wide area along said longitudinal direction and forming a raised area in said outer peripheral surface.

2. The fishing rod according to claim 1, wherein said fishing line guide member has a substantially oblong section.

3. The fishing rod according to claim 1, wherein said fishing line guide member has a substantially crescent section.

4. The fishing rod according to claim 1, wherein said portion of said rod pipe is radially thicker than the rest of said rod pipe.

5. The fishing rod according to claim 1, wherein a buffer layer is interposed between said fishing line guide member and said portion of said rod pipe.

6. The fishing rod according to claim 1, wherein said relatively flattened section is defined by a width dimension in a longitudinal direction of said rod pipe and a thickness dimension in a radial direction thereof, the width dimension being larger than said thickness dimension.

* * * * *